(12) United States Patent
Bai

(10) Patent No.: US 10,133,908 B2
(45) Date of Patent: Nov. 20, 2018

(54) ULTRASONIC FINGERPRINT SENSOR AND FINGERPRINT RECOGNITION MODULE

(71) Applicant: NANCHANG O-FILM BIO-IDENTIFICATION TECHNOLOGY CO., LTD., Nanchang (CN)

(72) Inventor: Anpeng Bai, Nanchang (CN)

(73) Assignee: NANCHANG O-FILM BIO-IDENTIFICATION TECHNOLOGY CO., LTD, Nanchang (CN)

( * ) Notice: Subject to any disclaimer, the term of this patent is extended or adjusted under 35 U.S.C. 154(b) by 39 days.

(21) Appl. No.: 15/490,046

(22) Filed: Apr. 18, 2017

(65) Prior Publication Data

US 2018/0068153 A1  Mar. 8, 2018

(30) Foreign Application Priority Data

Sep. 5, 2016 (CN) .......................... 2016 1 0802634
Sep. 5, 2016 (CN) ...................... 2016 2 1037977 U

(51) Int. Cl.
  *G06K 9/28* (2006.01)
  *G06K 9/00* (2006.01)

(52) U.S. Cl.
  CPC .................. *G06K 9/0002* (2013.01)

(58) Field of Classification Search
  CPC .................................................. G06K 9/0002
  See application file for complete search history.

(56) References Cited

U.S. PATENT DOCUMENTS

| | | | |
|---|---|---|---|
| 9,607,203 B1* | 3/2017 | Yazdandoost | A61B 5/1172 |
| 9,824,254 B1* | 11/2017 | Yazdandoost | G06K 9/0002 |
| 2003/0102777 A1* | 6/2003 | Kuniyasu | B06B 1/0629 |
| | | | 310/334 |
| 2007/0126315 A1* | 6/2007 | Scott | G06K 9/0002 |
| | | | 310/318 |
| 2012/0092026 A1* | 4/2012 | Liautaud | G06K 9/0002 |
| | | | 324/649 |

* cited by examiner

*Primary Examiner* — Brian Werner
(74) *Attorney, Agent, or Firm* — Hodgson Russ LLP

(57) ABSTRACT

The present disclosure discloses an ultrasonic fingerprint sensor. The ultrasonic fingerprint sensor includes a piezoelectric layer, a number of emitters, and a number of receiving electrode lines. The piezoelectric layer includes an array of piezoelectric posts. The emitters are formed on a lower end of the piezoelectric layer and correspond to the piezoelectric posts. Each of the emitters is connected to a corresponding piezoelectric post. The receiving electrode lines are arranged on an upper end of the piezoelectric layer, and each of the receiving electrode lines corresponds to a row of the piezoelectric posts and connected to the row of the piezoelectric posts. The present disclosure also discloses a fingerprint recognition module.

20 Claims, 3 Drawing Sheets

ULTRASONIC FINGERPRINT SENSOR AND FINGERPRINT RECOGNITION MODULE

CROSS-REFERENCE TO RELATED APPLICATION

This application claims priority to and benefits of Chinese Patent Application Serial No. CN 201610802634.8, filed with the State Intellectual Property Office of P. R. China on Sep. 5, 2016, and of Chinese Patent Application Serial No. CN 201621037977.1, filed with the State Intellectual Property Office of P. R. China on Sep. 5, 2016, the entire contents of which are incorporated herein by reference.

FIELD

The present disclosure relates to sensor technologies, and particularly, to an ultrasonic fingerprint sensor and a fingerprint recognition module having the ultrasonic fingerprint sensor.

BACKGROUND

An ultrasonic fingerprint sensor probe includes a pixel array. Each pixel is used to describe the depth of a point corresponding to the fingerprint of a finger. The point with a smaller depth is ridge, and the point with a larger depth is valley. The pixel array includes a piezoelectric post array. Each piezoelectric post can serve as a pixel. Two surfaces of the piezoelectric post array are respectively provided with an emitter electrode and a receiving electrode. During operation, a high frequency AC voltage is applied to the piezoelectric post array by the emitter electrode to generate an ultrasonic wave. The ultrasonic wave reflected by the finger reaches a piezoelectric layer, and a voltage, that is, the voltage of the receiving electrode, is formed at opposite ends of the piezoelectric post. Thus, the ultrasonic fingerprint sensor can identify the depth of the finger according to the voltage. At present, the emitter electrode of the ultrasonic fingerprint sensor is mainly made in the form of an emitting electrode line. The emitter electrode in the same row is excited to generate the ultrasonic wave, thereby easily producing crosstalk between adjacent pixels in the same row, and decreasing the identification quality of the ultrasonic fingerprint sensor.

SUMMARY

The present disclosure aims to solve at least one of the problems existing in the prior art to some extent at least. The present disclosure needs to provide an ultrasonic fingerprint sensor and a fingerprint recognition module having the ultrasonic fingerprint sensor.

The ultrasonic fingerprint sensor of embodiments of the present disclosure includes a piezoelectric layer, a number of emitters, and a number of receiving electrode lines. The piezoelectric layer includes an array of piezoelectric posts. The emitters are formed on a lower end of the piezoelectric layer and correspond to the piezoelectric posts. Each of the emitters is connected to a corresponding piezoelectric post. The receiving electrode lines are arranged on an upper end of the piezoelectric layer, and each of the receiving electrode lines corresponds to a row of the piezoelectric posts and connected to the row of the piezoelectric posts.

In some embodiments, the piezoelectric layer is PZT piezoelectric ceramic.

In some embodiments, the height of each of the piezoelectric posts is about 70-80 microns.

In some embodiments, the ultrasonic fingerprint sensor includes filler filled in the gap between the piezoelectric posts.

In some embodiments, the emitters comprise an alloy layer.

In some embodiments, the material of the alloy layer includes copper, nickel, or silver.

In some embodiments, the emitters further comprise a plurality of metal pads arranged on a lower surface of the alloy layer.

In some embodiments, the material of each of the metal pads includes gold or copper.

In some embodiments, the ultrasonic fingerprint sensor includes receivers arranged at a lower end of the piezoelectric posts and corresponding to an end of each of the receiving electrode lines, and each of the receivers is connected to the corresponding receiving electrode line.

In some embodiments, the ultrasonic fingerprint sensor includes wires, each of the receiving electrode lines corresponds to a wire and a receiver, each receiver and the corresponding receiving electrode line are positioned at opposite sides of the corresponding piezoelectric post, and each of the receiving electrode lines is connected to the corresponding emitter corresponding to an end of the receiving electrode line by the corresponding wire.

A fingerprint recognition module of embodiments of the present disclosure includes an ultrasonic fingerprint sensor. The ultrasonic fingerprint sensor includes:

a piezoelectric layer comprising an array of piezoelectric posts;

a plurality of emitters formed on a lower end of the piezoelectric layer and corresponding to the piezoelectric posts, each of the emitters is connected to a corresponding piezoelectric post; and a plurality of receiving electrode lines arranged on an upper end of the piezoelectric layer, and each of the receiving electrode lines corresponds to a row of the piezoelectric posts and is connected to the row of the piezoelectric posts.

In some embodiments, the piezoelectric layer is PZT piezoelectric ceramic.

In some embodiments, the height of each of the piezoelectric posts is about 70-80 microns.

In some embodiments, the ultrasonic fingerprint sensor includes filler filled in the gap between the piezoelectric posts.

In some embodiments, the emitters comprise an alloy layer.

In some embodiments, the material of the alloy layer includes copper, nickel, or silver.

In some embodiments, the emitters further comprise a plurality of metal pads arranged on a lower surface of the alloy layer.

In some embodiments, the material of each of the metal pads includes gold or copper.

In some embodiments, the ultrasonic fingerprint sensor includes receivers arranged at a lower end of the piezoelectric posts and corresponding to an end of each of the receiving electrode lines, and each of the receivers is connected to the corresponding receiving electrode line.

In some embodiments, the ultrasonic fingerprint sensor includes wires, each of the receiving electrode lines corresponds to a wire and a receiver, each receiver and the corresponding receiving electrode line are positioned at opposite sides of the corresponding piezoelectric post, and each of the receiving electrode lines is connected to the corresponding emitter corresponding to an end of the receiving electrode line by the corresponding wire.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
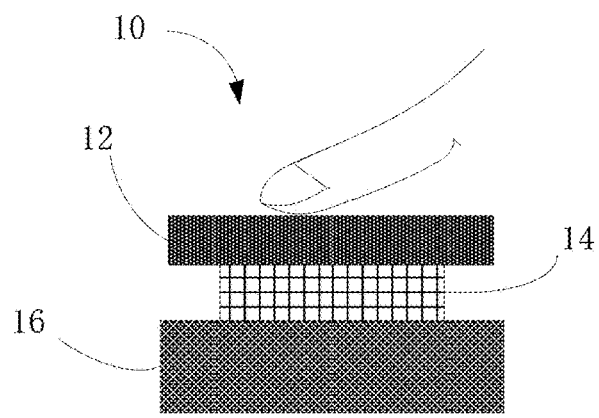
FIG. 1 is a cross-sectional view of a fingerprint recognition module, according to an embodiment of the present disclosure.
Figure 2:
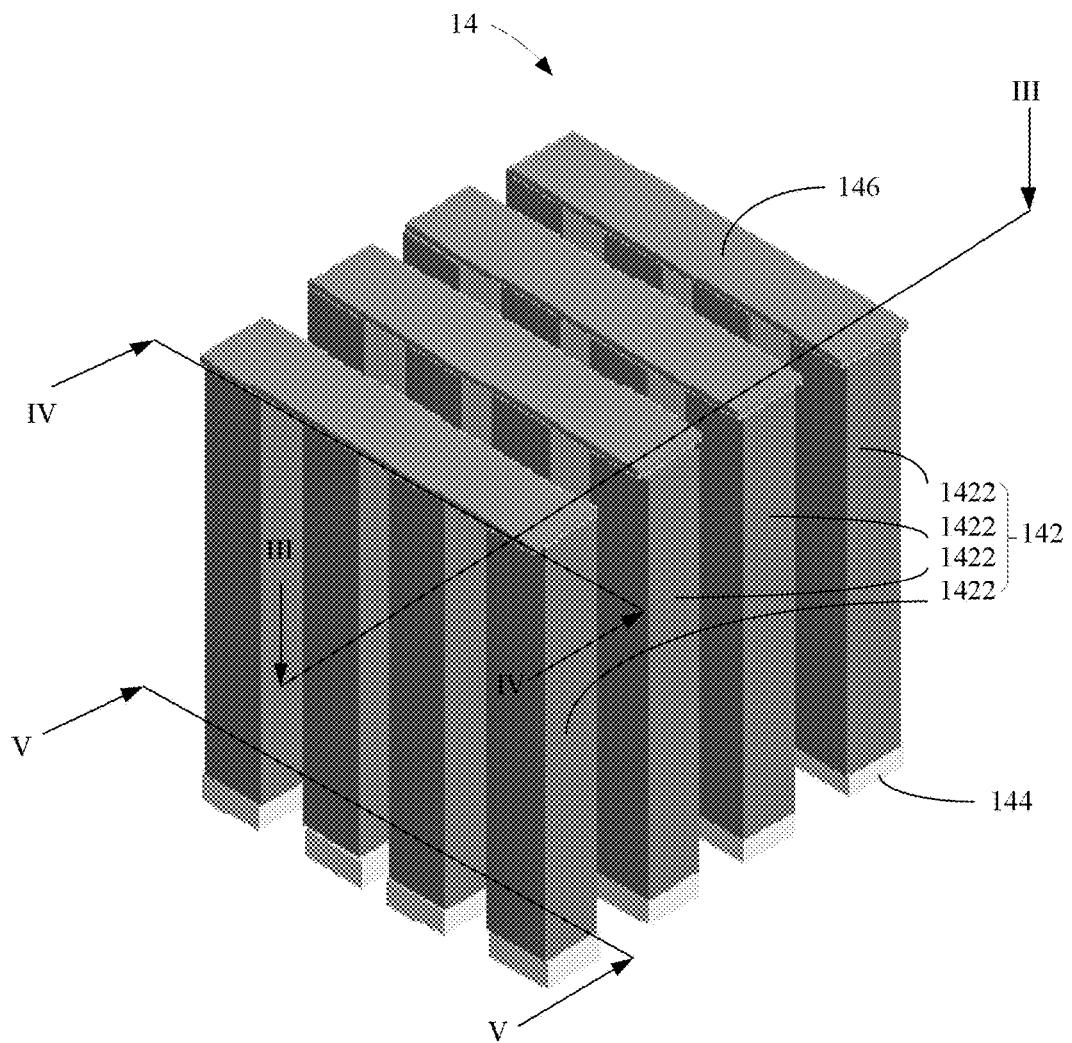
FIG. 2 is an isometric schematic view of an ultrasonic fingerprint sensor, according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions.

The embodiments described herein with reference to the accompanying drawings are explanatory and illustrative, which are used to generally understand the present disclosure. The embodiments shall not be construed to limit the present disclosure.

Referring to FIG. 1, a fingerprint recognition module 10, according to an embodiment of the present disclosure, includes a cover 12, an ultrasonic fingerprint sensor 14, and a control chip 16. The cover 12 and the control chip 16 are arranged on opposited sides of the ultrasonic fingerprint sensor 14. The ultrasonic fingerprint sensor 14 is configured to emit and receive ultrasonic wave signals. The control chip 16 is configured to process the ultrasonic wave signals. The cover 12 can be made of plastic, glass, or resin.

Referring to FIGS. 2-5, the ultrasonic fingerprint sensor 14 of this embodiment includes a piezoelectric layer 142, a number of emitters 144, and a number of receiving electrode lines 146. The piezoelectric layer 142 includes an array of piezoelectric posts 1422. The emitters 144 are formed on a lower end of the piezoelectric layer 142, and correspond to the piezoelectric posts 1422. Each of the emitters 144 is connected to a corresponding piezoelectric post 1422. The receiving electrode lines 146 are arranged on an upper end of the piezoelectric layer 142. Each of the receiving electrode lines 146 corresponds to a row of the piezoelectric posts 1422. Each of the receiving electrode lines 146 is connected to the row of the piezoelectric posts 1422.

Each piezoelectric post 1422 can server as a pixel, the piezoelectric posts 1422 form a number of pixels. Each pixel is used to describe the depth of a point corresponding to the fingerprint of a finger. When the ultrasonic fingerprint sensor 14 is working, each emitter 144 can individually excite a certain piezoelectric post 1422 instead of exciting a number of piezoelectric posts 1422 which can produce a big lateral noise, thereby ensuring that the ultrasonic fingerprint sensor 14 can more accurately identify the fingerprint. At the same time, comparing with the row excitation, the power of the point excitation is small, so the energy consumption of the ultrasonic fingerprint sensor 14 is smaller. Moreover, the emitters 144 can be adhered to the control chip 16 by a point-to-point adhesion, which makes manufacturing process simpler.

In detail, when the finger touches or is near to the cover 12, the voltage of the resonant frequency in the ultrasonic frequency band is applied externally to the emitters 144 and the receiving electrode lines 146, the piezoelectric layer 142 generates high frequency fluctuation deformation and emits ultrasonic wave signals. The ultrasonic wave signals are reflected toward inside the fingerprint recognition module 10 by the finger and reach the piezoelectric layer 142. At this time, all of the emitters 144 are grounded, the piezoelectric posts 1422 are deformed under the ultrasonic wave signals, thereby generating potential differences at different positions of the piezoelectric posts 1422. The receiving electrode lines 146 receive the potential difference information. The control chip 16 processes received voltage data and identifies the fingerprint image of the finger.

Figure 3:
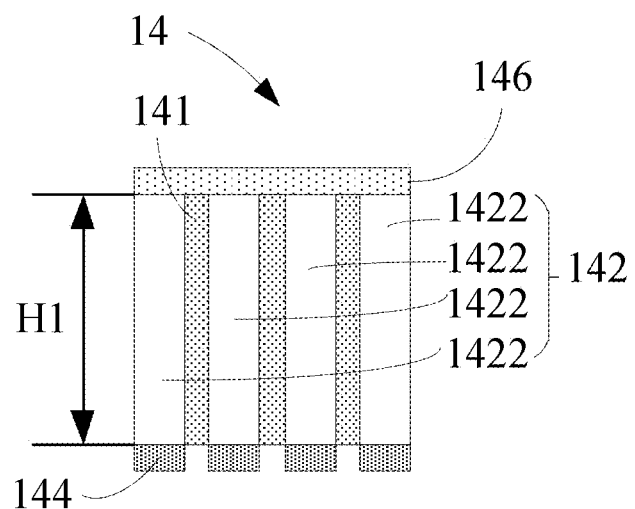
FIG. 3 is a cross-sectional view of the ultrasonic fingerprint sensor of FIG. 2 along the line III-III.

Referring to FIG. 3, in this embodiment, the height H1 of each of the piezoelectric posts 1422 is about 70-80 microns.

Figure 5:
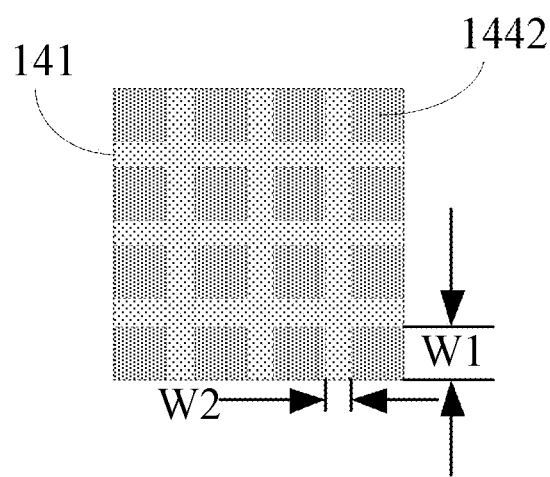
FIG. 5 is a bottom view of the ultrasonic fingerprint sensor of FIG. 2 after taking along the line V-V.

Referring to FIG. 5, in some embodiments, the cross section of each of the piezoelectric posts 1422 is substantially a square, and the width W1 of the square is about 30 microns. The width W2 of a gap between the piezoelectric posts 1422 can be about 50 microns.

In this way, the demand for high resolution of the ultrasonic fingerprint sensor 14, such as greater than 508 DPI, can be satisfied. When the gap width W2 is greater than 50 microns, the sampling resolution will be reduced, the emitted or received ultrasonic wave signals will become weak. Thus, the ultrasonic fingerprint sensor 14 cannot accurately identify the fingerprint. The shapes of the piezoelectric posts 1422 can be different, the sizes of the piezoelectric posts 1422 can be different, and the gap widths between the piezoelectric posts 1422 can be different.

In some embodiments, the material of the piezoelectric layer 142 can be PZT piezoelectric ceramic. The piezoelectric layer 142 can emit the ultrasonic wave signals using the positive piezoelectric effect of the piezoelectric layer 142, and receive the ultrasonic wave signals using the reverse piezoelectric effect of the piezoelectric layer 142. The PZT piezoelectric ceramic has stable temperature, excellent electrical properties, and vibration stability. Simultaneously, the preparation process of the PZT piezoelectric ceramic is simple, the raw materials are easy to obtain, and the price of the raw materials are low. Therefore, since the material of the piezoelectric layer 142 is PZT piezoelectric ceramic, the ultrasonic fingerprint sensor 14 can have good stability and low manufacturing cost.

In some embodiments, the material of the piezoelectric layer 142 can be other piezoelectric material having positive piezoelectric effect and reverse piezoelectric effect.

Figure 4:
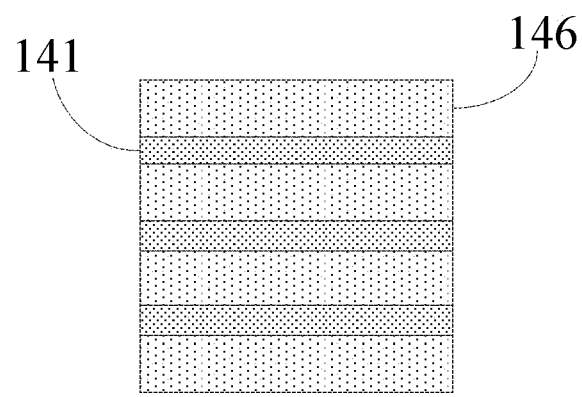
FIG. 4 is a top view of the ultrasonic fingerprint sensor of FIG. 2 after taking along the line IV-IV.

Referring to FIGS. 3-5, in some embodiments, the ultrasonic fingerprint sensor 14 can include filler 141. The filler 141 is filled in the gap between the piezoelectric posts 1422.

The filler 141 can reduce lateral noise between the piezoelectric posts 1422, caused by the gap.

In some embodiments, the material of the filler 141 can be epoxy resin. Since the epoxy resin, on the surface of metal and non-metallic material, has excellent bonding strength, good dielectric property, small deformation shrinkage, good stability of the dimension, high hardness, good flexibility, and stability for alkali and most solvents, and the like characteristics, the epoxy resin working as the filler 141 make the ultrasonic fingerprint sensor 14 more stable.

In some embodiments, the material of the filler 141 can be other non-conductive material, or other non-piezoelectric material. It is understood that the material of the filler 141 is not limited to those of the above-discussed embodiments.

Figure 6:
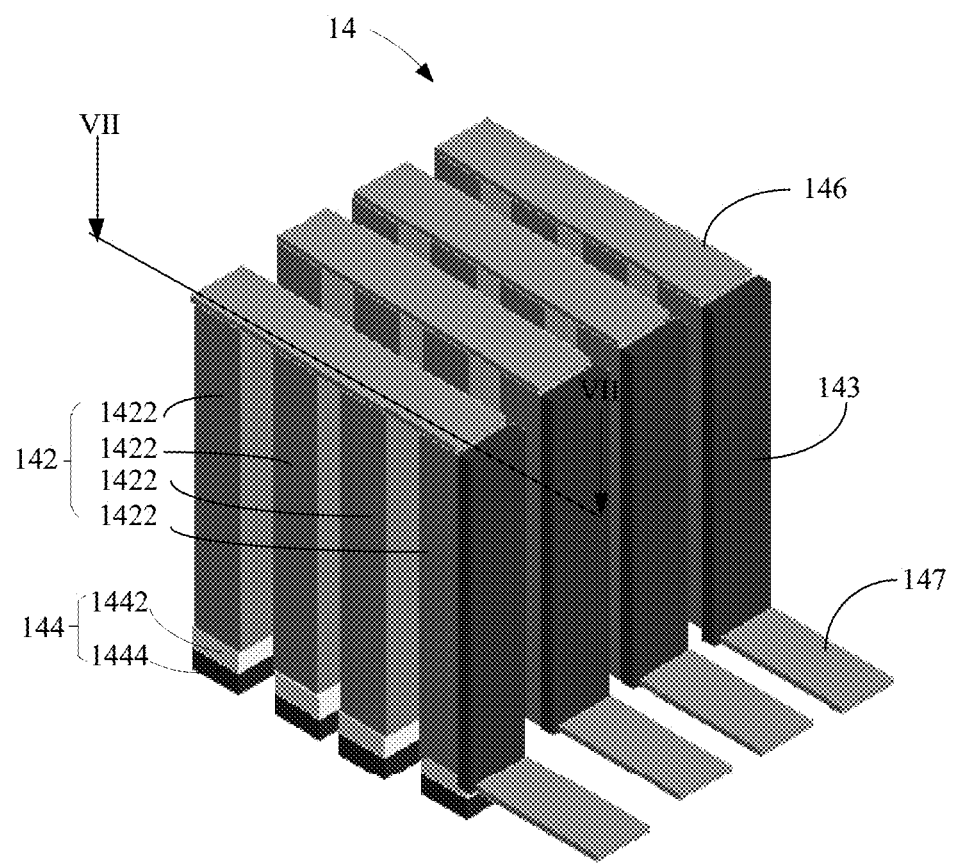
FIG. 6 is an isometric schematic view of an ultrasonic fingerprint sensor, according to an embodiment of the present disclosure.
Figure 7:
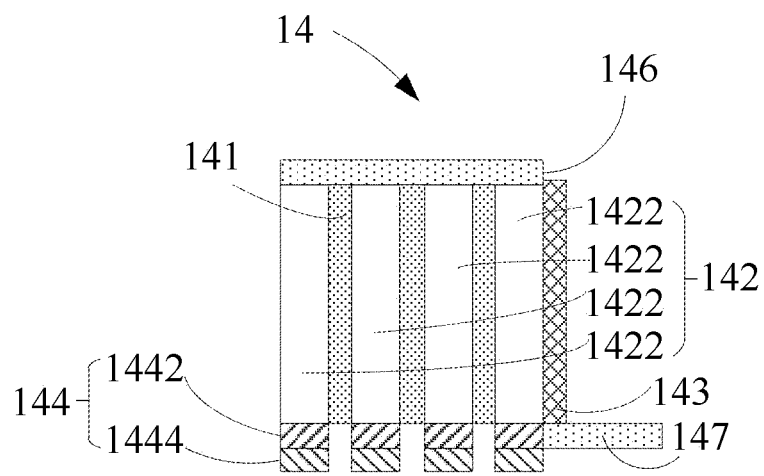
FIG. 7 is a cross-sectional view of the ultrasonic fingerprint sensor of FIG. 6 along the line VII-VII.

Referring to FIG. 6 and FIG. 7, in some embodiments, the emitters 144 includes an alloy layer 1442. The alloy layer 1442 has a greater hardness than pure metal, so that the structure of the ultrasonic fingerprint sensor 14 is more stable as the conductive alloy layer 1442.

In some embodiments, the material of the alloy layer 1442 can include copper, nickel, silver, or the like. Thus, the emitters 144 can have a good electrical conductivity, and the structure of the ultrasonic fingerprint sensor 14 is more stable.

In some embodiments, the emitters 144 further include a number of metal pads 1444 arranged on a lower surface of the alloy layer 1442. That is, the entire ultrasonic fingerprint sensor 14 can be padded by the metal pads 1444 so that the ultrasonic fingerprint sensor 14 and the control chip 16 can better fit together, and the emitters 144 can be easily adhered to the control chip 16 by a point-to-point adhesion.

In some embodiments, the material of each of the metal pads 1444 can be gold or copper.

Also referring to FIG. 6 and FIG. 7, the ultrasonic fingerprint sensor 14 of this embodiment further includes wires 143 and receivers 147. Each of the receiving electrode lines 146 corresponds to a wire 143 and a receiver 147. The receivers 147 are arranged at a lower end of the piezoelectric posts 1422 corresponding to an end of the receiving electrode line 146. Each receiver 147 and the corresponding receiving electrode line 146 are positioned at opposite sides of the corresponding piezoelectric post 1422. Each of the receiving electrode lines 146 is connected to the corresponding emitter 144 corresponding to an end of the receiving electrode line 146 by the corresponding wire 143. Thus, the receiving electrode lines 146 can be connected to the control chip 16, and the structure of the ultrasonic fingerprint sensor 14 becomes simpler. Simultaneously, the ultrasonic fingerprint sensor 14 can be adhered to the control chip 16 by a point-to-point adhesion, which makes manufacturing process simpler.

In this present disclosure, unless indicated otherwise, a structure in which a first feature is "on" or "underneath" a second feature may include an embodiment in which the first feature directly contacts the second feature and may include an embodiment in which an additional feature is prepared between the first feature and the second feature so that the first feature does not directly contact the second feature. Furthermore, a structure in which a first feature is "on" or "above" a second feature may include an embodiment in which the first feature is right above or inclined above the second feature and may include an embodiment in which the first feature is higher than the second feature. A structure in which a first feature is "under" or "below" a second feature may include an embodiment in which the first feature is right under or inclined under the second feature and may include an embodiment in which the first feature is lower than the second feature.

Reference throughout this specification to "an embodiment," "some embodiments," "an illustrated embodiment", "an example," "a specific example," or "some examples," means that a particular feature, structure, material, or characteristic described in connection with the embodiment or example is included in at least one embodiment or example of the present disclosure. The schematic expressions of the above-mentioned phrases throughout this specification are not necessarily referring to the same embodiment or example of the present disclosure. Furthermore, the particular features, structures, materials, or characteristics can be combined in any suitable manner in any one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An ultrasonic fingerprint sensor comprising:
a piezoelectric layer comprising an array of piezoelectric posts;
a plurality of emitters formed on a lower end of the piezoelectric layer and corresponding to the piezoelectric posts, each of the emitters connected to a corresponding piezoelectric post; and
a plurality of receiving electrode lines arranged on an upper end of the piezoelectric layer, and each of the receiving electrode lines corresponding to a row of the piezoelectric posts and connected to the row of the piezoelectric posts.

2. The ultrasonic fingerprint sensor of claim 1, wherein the piezoelectric layer is PZT piezoelectric ceramic.

3. The ultrasonic fingerprint sensor of claim 1, wherein the height of each of the piezoelectric posts is about 70-80 microns.

4. The ultrasonic fingerprint sensor of claim 1, wherein the ultrasonic fingerprint sensor comprises filler filled in the gap between the piezoelectric posts.

5. The ultrasonic fingerprint sensor of claim 1, wherein the emitters comprise an alloy layer.

6. The ultrasonic fingerprint sensor of claim 5, wherein the material of the alloy layer comprises copper, nickel, or silver.

7. The ultrasonic fingerprint sensor of claim 5, wherein the emitters further comprise a plurality of metal pads arranged on a lower surface of the alloy layer.

8. The ultrasonic fingerprint sensor of claim 5, wherein the material of each of the metal pads comprises gold or copper.

9. The ultrasonic fingerprint sensor of claim 1, wherein the ultrasonic fingerprint sensor comprises receivers arranged at a lower end of the piezoelectric posts and corresponding to an end of each of the receiving electrode lines, and each of the receivers is connected to the corresponding receiving electrode line.

10. The ultrasonic fingerprint sensor of claim 9, wherein the ultrasonic fingerprint sensor comprises wires, each of the receiving electrode lines corresponds to a wire and a receiver, each receiver and the corresponding receiving electrode line are positioned at opposite sides of the corresponding piezoelectric post, and each of the receiving electrode lines is connected to the corresponding emitter corresponding to an end of the receiving electrode line by the corresponding wire.

11. A fingerprint recognition module comprising an ultrasonic fingerprint sensor, wherein the ultrasonic fingerprint sensor comprises:
  a piezoelectric layer comprising an array of piezoelectric posts;
  a plurality of emitters formed on a lower end of the piezoelectric layer and corresponding to the piezoelectric posts, each of the emitters is connected to a corresponding piezoelectric post; and
  a plurality of receiving electrode lines arranged on an upper end of the piezoelectric layer, and each of the receiving electrode lines corresponds to a row of the piezoelectric posts and is connected to the row of the piezoelectric posts.

12. The fingerprint recognition module of claim 11, wherein the piezoelectric layer is PZT piezoelectric ceramic.

13. The fingerprint recognition module of claim 11, wherein the height of each of the piezoelectric posts is about 70-80 microns.

14. The fingerprint recognition module of claim 11, wherein the ultrasonic fingerprint sensor comprises filler filled in the gap between the piezoelectric posts.

15. The fingerprint recognition module of claim 11, wherein the emitters comprise an alloy layer.

16. The fingerprint recognition module of claim 15, wherein the material of the alloy layer comprises copper, nickel, or silver.

17. The fingerprint recognition module of claim 15, wherein the emitters further comprise a plurality of metal pads arranged on a lower surface of the alloy layer.

18. The fingerprint recognition module of claim 15, wherein the material of each of the metal pads comprises gold or copper.

19. The fingerprint recognition module of claim 11, wherein the ultrasonic fingerprint sensor comprises receivers arranged at a lower end of the piezoelectric posts and corresponding to an end of each of the receiving electrode lines, and each of the receivers is connected to the corresponding receiving electrode line.

20. The fingerprint recognition module of claim 19, wherein the ultrasonic fingerprint sensor comprises wires, each of the receiving electrode lines corresponds to a wire and a receiver, each receiver and the corresponding receiving electrode line are positioned at opposite sides of the corresponding piezoelectric post, and each of the receiving electrode lines is connected to the corresponding emitter corresponding to an end of the receiving electrode line by the corresponding wire.

* * * * *